(12) United States Patent
Watanabe et al.

(10) Patent No.: US 8,171,344 B2
(45) Date of Patent: May 1, 2012

(54) SYSTEM, METHOD AND COMPUTER READABLE STORAGE MEDIUM FOR TROUBLESHOOTING

(75) Inventors: Yukihiro Watanabe, Kawasaki (JP); Yasuhide Matsumoto, Kawasaki (JP); Kuniaki Shimada, Kawasaki (JP); Yuji Wada, Kawasaki (JP); Masazumi Matsubara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/892,067

(22) Filed: Sep. 28, 2010

(65) Prior Publication Data

US 2011/0016355 A1    Jan. 20, 2011

Related U.S. Application Data

(63) Continuation of application No. PCT/JP2008/056397, filed on Mar. 31, 2008.

(51) Int. Cl.
    *G06F 11/00* (2006.01)
(52) U.S. Cl. .......................................... 714/37; 714/26
(58) Field of Classification Search .............. 714/26, 714/37
    See application file for complete search history.

(56) References Cited

U.S. PATENT DOCUMENTS

| | | | | |
|---|---|---|---|---|
| 5,521,842 A | * | 5/1996 | Yamada ........................ | 709/224 |
| 5,568,491 A | * | 10/1996 | Beal et al. ..................... | 714/746 |
| 5,592,614 A | * | 1/1997 | Peters ............................ | 714/26 |
| 5,661,668 A | * | 8/1997 | Yemini et al. ................. | 702/186 |
| 5,799,148 A | * | 8/1998 | Cuddihy et al. ............... | 714/26 |
| 5,944,839 A | * | 8/1999 | Isenberg ........................ | 714/26 |
| 6,076,083 A | * | 6/2000 | Baker ............................ | 706/52 |
| 6,473,659 B1 | * | 10/2002 | Shah et al. .................... | 700/79 |
| 7,031,879 B1 | * | 4/2006 | Loboz et al. .................. | 702/182 |
| 7,133,866 B2 | * | 11/2006 | Rishel et al. .................. | 1/1 |

(Continued)

FOREIGN PATENT DOCUMENTS

JP    11-219213    8/1999

(Continued)

OTHER PUBLICATIONS

Yoshihara et al.; "Implementation and Evaluation of Automated Home Network Diagnosis Based on Configuration Matching;" IEICE Technical Report, The Institute of Electronics, Information and Communication Engineers; Jun. 9, 2005; vol. 105, No. 113, pp. 23-28.

(Continued)

*Primary Examiner* — Robert Beausoliel, Jr.
*Assistant Examiner* — Joshua P Lottich
(74) *Attorney, Agent, or Firm* — Greer, Burns & Crain, Ltd.

(57) ABSTRACT

A troubleshooting system that receivesing as input one or more symptom(s) of trouble of an IT system and outputting a remedy for the symptom, the troubleshooting system including: a first data base to collecting configuration information of the IT system, a second data base to collecting incidents of trouble including symptoms of trouble and remedies for dealing with the symptoms, a first storage unit to deriveing and storeing configuration information of incidents of trouble from the first data base and the second data base using the configuration information as a key, a configuration information similarity degree calculation unit to calculating similarity degrees between input configuration information of the IT system experiencing trouble and configuration information of the incidents of trouble, and an output unit to presenting a remedy for the IT system experiencing the trouble together with the similarity degree.

11 Claims, 14 Drawing Sheets

U.S. PATENT DOCUMENTS

| | | | |
|---|---|---|---|
| 7,137,041 B2 * | 11/2006 | Kaminsky et al. | 714/47.1 |
| 7,146,536 B2 * | 12/2006 | Bingham et al. | 714/26 |
| 7,328,376 B2 * | 2/2008 | McGuire et al. | 714/48 |
| 7,379,846 B1 * | 5/2008 | Williams et al. | 702/185 |
| 7,389,444 B2 * | 6/2008 | Ma et al. | 714/26 |
| 7,418,628 B2 * | 8/2008 | Arend | 714/26 |
| 7,580,906 B2 * | 8/2009 | Faihe | 706/14 |
| 7,620,849 B2 * | 11/2009 | Kato et al. | 714/26 |
| 7,707,133 B2 * | 4/2010 | Das et al. | 706/50 |
| 7,788,536 B1 * | 8/2010 | Qureshi et al. | 714/38.14 |
| 2004/0078721 A1 * | 4/2004 | Williams | 714/46 |
| 2005/0080806 A1 * | 4/2005 | Doganata et al. | 707/102 |
| 2005/0097396 A1 * | 5/2005 | Wood | 714/25 |
| 2005/0216785 A1 * | 9/2005 | Suzuki et al. | 714/4 |
| 2006/0025962 A1 * | 2/2006 | Ma et al. | 702/182 |
| 2006/0168475 A1 * | 7/2006 | Segers et al. | 714/25 |
| 2008/0126858 A1 * | 5/2008 | Barras | 714/25 |
| 2008/0133288 A1 * | 6/2008 | Thibaux et al. | 705/7 |
| 2008/0288821 A1 * | 11/2008 | Aaron | 714/26 |
| 2009/0063902 A1 * | 3/2009 | Cowart et al. | 714/37 |
| 2010/0131800 A1 * | 5/2010 | Fujimaki et al. | 714/37 |

FOREIGN PATENT DOCUMENTS

| | | |
|---|---|---|
| JP | 2003-179601 | 6/2003 |
| JP | 2007-94538 | 4/2007 |

OTHER PUBLICATIONS

International Search Report issued in International App. No. PCT/JP2008/056397, mailed Jul. 8, 2008.

Partial English translation of Yoshihara et al.; "Implementation and Evaluation of Automated Home Network Diagnosis Based on Configuration Matching;" IEICE Technical Report, The Institute of Electronics, Information and Communication Engineers; Jun. 9, 2005; vol. 105, No. 113, pp. 23-28.

* cited by examiner

FIG.5

| TROUBLESHOOTING KNOWLEDGE ID | SCORE | REMEDY |
|---|---|---|
| Symptom-002 | 0.43 | CLEAN UP DISK... |
| Symptom-004 | 0.39 | SET SECONDARY LDAP SERVER... |
| Symptom-003 | 0.35 | CHANGE LOAD DISPERSAL MONITORING MEANS... |
| Symptom-005 | 0.13 | CHANGE TCP SETTING OF SERVER... |

FIG.6

PAST INCIDENTS OF TROUBLE

| INCIDENT ID | SYSTEM ID | SYMPTOMS | DETAILS OF SYMPTOMS | CAUSE | REMEDY | LAYER |
|---|---|---|---|---|---|---|
| 006-0801-2054-001 | C-web-001 | SERVER UNABLE TO START UP | SERVER WILL NOT START UP, POWER LED WILL NOT LIGHT UP | ABNORMALITY IN POWER UNIT | REPLACE POWER UNIT... | HARDWARE CONFIGURATION |
| 007-0620-1802-020 | T-db-020 | SOFTWARE CONNECTION BROKEN | CONNECTION FROM CLIENT INTERMITTENTLY DISABLED | INSUFFICIENT DISK CAPACITY OF WEB SERVER | CLEAN UP DISK... | HARDWARE CONFIGURATION |
| 006-0425-1232-015 | T-crm-002 | SOFTWARE CONNECTION BROKEN | CONNECTION FAILS EVERY CERTAIN NUMBER OF TIMES | TROUBLE IN SETTING LOAD BALANCER | CHANGE LOAD DISPERSAL MONITORING MEANS... | NETWORK CONNECTION CONFIGURATION |
| 006-1227-0601-085 | M-rsv-011 | SOFTWARE CONNECTION BROKEN | FAILED TRANSITION TO AUTHORIZED PAGE | TROUBLE IN LDAP SERVER | SET SECONDARY LDAP SERVER... | SOFTWARE CONFIGURATION |
| 007-0223-0448-004 | T-trs-009 | SOFTWARE CONNECTION BROKEN | CONNECTION FROM CLIENT INTERMITTENTLY IMPOSSIBLE | WAITING TIME CAUSED FOR RELEASE DUE TO INSUFFICIENT PORT RESOURCES OF SERVER | CHANGE TCP SETTING OF SERVER... | NETWORK CONNECTION CONFIGURATION |
| .. | .. | .. | .. | .. | .. | .. |

INCIDENTS OF TROUBLE — TROUBLESHOOTING KNOWLEDGE ID

| | SYMPTOM | SYSTEM ID | REMEDY |
|---|---|---|---|
| Symptom-001 | SERVER UNABLE TO START UP | C-web-001 | REPLACE POWER UNIT |
| Symptom-002 | SOFTWARE CONNECTION BROKEN | T-db-020 | CLEAN UP DISK AND SET LOG ROTATION |
| Symptom-003 | SOFTWARE CONNECTION BROKEN | T-crm-002 | CHANGE LOAD DISPERSL MONITORING MEANS FROM ICMP TO TCP SESSION MONITORING |
| Symptom-004 | SOFTWARE CONNECTION BROKEN | M-rsv-011 | SET SECONDARY LDAP SERVER |
| Symptom-005 | SOFTWARE CONNECTION BROKEN | T-trs-009 | CHANGE TCP SETTINGS OF SERVER AND INCREASE USABLE PORTS |

FIG.7

PAST INCIDENTS OF TROUBLE

| INCIDENT ID | SYSTEM ID | SYMPTOMS | DETAILS OF SYMPTOMS | | | |
|---|---|---|---|---|---|---|
| | | | | CAUSE | REMEDY | LAYER |
| 006-0801-2054-001 | C-web-001 | SERVER UNABLE TO START UP | SERVER WILL NOT START UP, POWER LED WILL NOT LIGHT UP | ABNORMALITY IN POWER UNIT | REPLACE POWER UNIT.... | HARDWARE CONFIGURATION |
| 007-0620-1802-020 | T-db-020 | SOFTWARE CONNECTION BROKEN | CONNECTION FROM CLIENT INTERMITTENTLY DISABLED | INSUFFICIENT DISK CAPACITY OF WEB SERVER | CLEAN UP DISK... | HARDWARE CONFIGURATION |
| 006-0425-1232-015 | T-crm-002 | SOFTWARE CONNECTION BROKEN | CONNECTION FAILS EVERY CERTAIN NUMBER OF TIMES | TROUBLE IN SETTING LOAD BALANCER | CHANGE LOAD DISPERSAL MONITORING MEANS... | NETWORK CONNECTION CONFIGURATION |
| 006-1227-0601-085 | M-rsv-011 | SOFTWARE CONNECTION BROKEN | FAILED TRANSITION TO AUTHORIZED PAGE | TROUBLE IN LDAP SERVER | SET SECONDARY LDAP SERVER... | SOFTWARE CONFIGURATION |
| 007-0223-0448-004 | T-trs-009 | SOFTWARE CONNECTION BROKEN | CONNECTION FROM CLIENT INTERMITTENTLY IMPOSSIBLE | WAITING TIME CAUSED FOR RELEASE DUE TO INSUFFICIENT PORT RESOURCES OF SERVER | CHANGE TCP SETTING OF SERVER... | NETWORK CONNECTION CONFIGURATION |
| ... | | | | | | ... |

ONE CASE IN FOUR

SYMPTOM-LAYER RELATION INFORMATION

| SYMPTOM | PROBABILITY OF OCCURRENCE | LAYER |
|---|---|---|
| SERVER UNABLE TO START UP | 1.00 | HARDWARE CONFIGURATION |
| SOFTWARE CONNECTION BROKEN | 0.25 | HARDWARE CONFIGURATION |
| | 0.50 | NETWORK CONNECTION CONFIGURATION |
| | 0.25 | SOFTWARE LAYER CONFIGURATION |

|  | SwC | SwD | Svr-a | Svr-b | Svr-c | Svr-d | Svr-e | Svr-f | Svr-g | Svr-h |
|---|---|---|---|---|---|---|---|---|---|---|
| SwC |  | 1 | 1 | 1 | 1 | 1 | 0 | 0 | 0 | 0 |
| SwD | 1 |  | 0 | 0 | 0 | 0 | 1 | 1 | 1 | 1 |
| Svr-a | 1 | 0 |  | 0 | 0 | 0 | 0 | 0 | 0 | 0 |
| Svr-b | 1 | 0 | 0 |  | 0 | 0 | 0 | 0 | 0 | 0 |
| Svr-c | 1 | 0 | 0 | 0 |  | 0 | 0 | 0 | 0 | 0 |
| Svr-d | 1 | 0 | 0 | 0 | 0 |  | 0 | 0 | 0 | 0 |
| Svr-e | 0 | 1 | 0 | 0 | 0 | 0 |  | 0 | 0 | 0 |
| Svr-f | 0 | 1 | 0 | 0 | 0 | 0 | 0 |  | 0 | 0 |
| Svr-g | 0 | 1 | 0 | 0 | 0 | 0 | 0 | 0 |  | 0 |
| Svr-h | 0 | 1 | 0 | 0 | 0 | 0 | 0 | 0 | 0 |  |

WEB    APL    DB

|       | Svr-e | Svr-f | Svr-a | Svr-b | Svr-c | Svr-d | Svr-g | Svr-h |
|-------|-------|-------|-------|-------|-------|-------|-------|-------|
| Svr-e |       | 0     | 1     | 1     | 1     | 1     | 1     | 1     |
| Svr-f | 0     |       | 1     | 1     | 1     | 1     | 1     | 1     |
| Svr-a | 1     | 1     |       | 0     | 0     | 0     | 0     | 0     |
| Svr-b | 1     | 1     | 0     |       | 0     | 0     | 0     | 0     |
| Svr-c | 1     | 1     | 0     | 0     |       | 0     | 0     | 0     |
| Svr-d | 1     | 1     | 0     | 0     | 0     |       | 0     | 0     |
| Svr-g | 1     | 1     | 0     | 0     | 0     | 0     |       | 0     |
| Svr-h | 1     | 1     | 0     | 0     | 0     | 0     | 0     |       |

FIG. 11A  ENVIRONMENT EXPERIENCING TROUBLE: LAYER IS NETWORK CONNECTION CONFIGURATION

|  | Svr-e | Svr-f | Svr-a | Svr-b | Svr-c | Svr-d | Svr-g | Svr-h |
|---|---|---|---|---|---|---|---|---|
| Svr-e |  | 0 | 1 | 1 | 1 | 1 | 1 | 1 |
| Svr-f | 0 |  | 0 | 0 | 1 | 1 | 1 | 1 |
| Svr-a | 1 | 0 |  | 0 | 0 | 0 | 0 | 0 |
| Svr-b | 1 | 1 | 0 |  | 0 | 0 | 0 | 0 |
| Svr-c | 1 | 1 | 0 | 0 |  | 0 | 0 | 0 |
| Svr-d | 1 | 1 | 0 | 0 | 0 |  | 0 | 0 |
| Svr-g | 1 | 1 | 0 | 0 | 0 | 0 |  | 0 |
| Svr-h | 1 | 1 | 0 | 0 | 0 | 0 | 0 |  |

→ SIMILARITY DEGREE (CORRELATION COEFFICIENT): 0.92884

FIG. 11B  SYSTEM ID IS T-db-020 AND LAYER IS NETWORK CONNECTION CONFIGURATION

|  | Svr-e | Svr-f | Svr-a | Svr-b | Svr-c | Svr-d | Svr-g | Svr-h |
|---|---|---|---|---|---|---|---|---|
| Svr-e |  | 0 | 1 | 1 | 1 | 1 | 1 | 1 |
| Svr-f | 0 |  | 1 | 1 | 1 | 1 | 1 | 1 |
| Svr-a | 1 | 1 |  | 0 | 0 | 0 | 0 | 0 |
| Svr-b | 1 | 1 | 0 |  | 0 | 0 | 0 | 0 |
| Svr-c | 1 | 1 | 0 | 0 |  | 0 | 0 | 0 |
| Svr-d | 1 | 1 | 0 | 0 | 0 |  | 0 | 0 |
| Svr-g | 1 | 1 | 0 | 0 | 0 | 0 |  | 0 |
| Svr-h | 1 | 1 | 0 | 0 | 0 | 0 | 0 |  |

→ SIMILARITY DEGREE (CORRELATION COEFFICIENT): 0.92884

FIG. 12A ENVIRONMENT EXPERIENCING TROUBLE: LAYER IS NETWORK CONNECTION CONFIGURATION

|       | Svr-e | Svr-f | Svr-a | Svr-b | Svr-c | Svr-d | Svr-g | Svr-h |
|-------|-------|-------|-------|-------|-------|-------|-------|-------|
| Svr-e | \     | 0     | 1     | 1     | 1     | 1     | 1     | 1     |
| Svr-f | 0     | \     | 0     | 1     | 1     | 1     | 1     | 1     |
| Svr-a | 1     | 0     | \     | 0     | 0     | 0     | 0     | 0     |
| Svr-b | 1     | 1     | 0     | \     | 0     | 0     | 0     | 0     |
| Svr-c | 1     | 1     | 0     | 0     | \     | 0     | 0     | 0     |
| Svr-d | 1     | 1     | 0     | 0     | 0     | \     | 0     | 0     |
| Svr-g | 1     | 1     | 0     | 0     | 0     | 0     | \     | 0     |
| Svr-h | 1     | 1     | 0     | 0     | 0     | 0     | 0     | \     |

SIMILARITY DEGREE (CORRELATION COEFFICIENT): 0.90830

FIG. 12B SYSTEM ID IS T-db-027 AND LAYER IS NETWORK CONNECTION CONFIGURATION

|       | Svr-e | Svr-f | Svr-a | Svr-b | Svr-c | Svr-d | Svr-g |
|-------|-------|-------|-------|-------|-------|-------|-------|
| Svr-e | \     | 0     | 1     | 1     | 1     | 1     | 1     |
| Svr-f | 0     | \     | 1     | 1     | 1     | 1     | 1     |
| Svr-a | 1     | 1     | \     | 0     | 0     | 0     | 0     |
| Svr-b | 1     | 1     | 0     | \     | 0     | 0     | 0     |
| Svr-c | 1     | 1     | 0     | 0     | \     | 0     | 0     |
| Svr-d | 1     | 1     | 0     | 0     | 0     | \     | 0     |
| Svr-g | 1     | 1     | 0     | 0     | 0     | 0     | \     |

SIMILARITY DEGREE (CORRELATION COEFFICIENT): 0.90830

FIG. 13

| Trouble-shooting Knowledge ID | Symptom | System ID | Remedy | Layer | Probability of Occurrence | Similarity Degree | Score | Order of Suggestion |
|---|---|---|---|---|---|---|---|---|
| Symptom-002 | SOFTWARE CONNECTION BROKEN | T-db-020 | CLEAN UP DISK AND SET LOG ROTATION | SOFTWARE CONFIGURATION | 0.25 | 0.25 | 0.06 | 1 |
| | | | | NETWORK CONNECTION CONFIGURATION | 0.86 | 0.50 | 0.43 | |
| | | | | PHYSICAL CONNECTION CONFIGURATION | 0.75 | 0.00 | 0.00 | |
| | | | | HARDWARE CONFIGURATION | 0.25 | 0.25 | 0.06 | |
| | | | | SYSTEM DEVICE CONFIGURATION | 0.52 | 0.00 | 0.00 | |
| Symptom-003 | SOFTWARE CONNECTION BROKEN | T-crm-002 | CHANGE LOAD DISPERSAL MONITORING MEANS FROM ICMP TO TCP SESSION MONITORING | SOFTWARE CONFIGURATION | 0.42 | 0.25 | 0.11 | 3 |
| | | | | NETWORK CONNECTION CONFIGURATION | 0.72 | 0.50 | 0.36 | |
| | | | | PHYSICAL CONNECTION CONFIGURATION | 0.66 | 0.00 | 0.00 | |
| | | | | HARDWARE CONFIGURATION | 0.70 | 0.25 | 0.17 | |
| | | | | SYSTEM DEVICE CONFIGURATION | 0.70 | 0.00 | 0.00 | |
| Symptom-004 | SOFTWARE CONNECTION BROKEN | M-rsv-011 | SET SECONDARY LDAP SERVER | SOFTWARE CONFIGURATION | 0.50 | 0.25 | 0.13 | 2 |
| | | | | NETWORK CONNECTION CONFIGURATION | 0.79 | 0.50 | 0.39 | |
| | | | | PHYSICAL CONNECTION CONFIGURATION | 0.60 | 0.00 | 0.00 | |
| | | | | HARDWARE CONFIGURATION | 0.40 | 0.25 | 0.10 | |
| | | | | SYSTEM DEVICE CONFIGURATION | 0.58 | 0.00 | 0.00 | |
| Symptom-005 | SOFTWARE CONNECTION BROKEN | T-trs-009 | CHANGE TCP SETTING OF SERVER AND INCREASE USABLE PORTS | SOFTWARE CONFIGURATION | 0.25 | 0.25 | 0.06 | 4 |
| | | | | NETWORK CONNECTION CONFIGURATION | 0.10 | 0.50 | 0.05 | |
| | | | | PHYSICAL CONNECTION CONFIGURATION | 0.40 | 0.00 | 0.00 | |
| | | | | HARDWARE CONFIGURATION | 0.50 | 0.25 | 0.13 | |
| | | | | SYSTEM DEVICE CONFIGURATION | 0.48 | 0.00 | 0.00 | |

US 8,171,344 B2

SYSTEM, METHOD AND COMPUTER READABLE STORAGE MEDIUM FOR TROUBLESHOOTING

CROSS-REFERENCE TO RELATED APPLICATIONS

This application is a continuation application and is based upon the International Application No. PCT/JP2008/056397, filed on Mar. 31, 2008, the entire contents of which are incorporated herein by reference.

FIELD

The present embodiments relate to a system, method and computer readable storage medium for troubleshooting in an IT system, more particularly to a troubleshooting system applied to management of the operation of an IT system and enabling the selection of a plurality of remedies for trouble in accordance with the state of the IT system and to a method and program for the same.

BACKGROUND

In general, in troubleshooting of an IT system, when detecting a drop in response or other trouble, in general, the method is employed of repeatedly sampling and analyzing information relating to the location of the trouble to identify the cause of the trouble.

In the past, the information sampled was determined by knowhow of the actual SE in charge of the troubleshooting. Therefore, troubleshooting required an advanced level of skill on the part of the SE. Depending on the skill of the SE, a long time was required until the trouble was resolved so there was an issue in terms of time and cost.

Japanese Laid-Open Patent Publication No. 2003-179601 discloses an invention having as its object the provision of a transmission network system enabling identification of the location of trouble in the network without depending on the skill of the manager. The transmission network system described in Japanese Laid-Open Patent Publication No. 2003-179601 is provided with a plurality of detectors for detecting trouble in a plurality of component elements forming the network and emitting alarm information, a correspondence relationship storage unit storing in advance information illustrating a correspondence relationship between the plurality of component elements of the transmission network system and a plurality of network elements set in advance grouping hierarchically the plurality of component elements, and a ripple relationship storage unit storing information illustrating the ripple relationship of trouble among a plurality of network elements. Further, the transmission network system is provided with a narrowing means for narrowing down the network elements in which the trouble spot may be included from alarm information emitted from the detectors and a trouble spot identifying means for identifying a trouble spot from the network elements narrowed down by the narrowing means and information stored in the correspondence relationship storage unit and ripple relationship storage unit.

However, the invention described in Japanese Laid-Open Patent Publication No. 2003-179601 detects trouble in the transmission network system and issues alarm information to identify a trouble spot. It does not present candidate remedies to the SE from incidents of remedies stored for trouble occurring in the past by having the SE input one or more symptom(s) of the trouble. For this reason, since the invention described in Japanese Laid-Open Patent Publication No. 2003-179601 does not store incidents of remedies for trouble occurring in the past, there is no learning function and the ability to detect trouble is not improved over time.

In recent years, a "troubleshooting system" for resolving trouble in a short time regardless of the skill of the SE has been devised. This troubleshooting system resolves trouble in a short time by enabling active use of knowhow unique to SEs performing troubleshooting and other implicit knowledge as shared knowledge of SEs. This troubleshooting system stores troubleshooting knowledge prepared from past troubleshooting incidents etc., has the SE input information expressing the symptom of the phenomenon of the trouble etc., searches through the stored troubleshooting knowledge at that time, and presents to the SE candidates for the causes or remedies correlated with the phenomenon. However, when there are a plurality of candidate causes or remedies for certain trouble, the SE has to determine which remedy to try first from the candidate remedies. He must repeatedly select candidate remedies until finding the cause of the trouble.

SUMMARY

According to an aspect of the embodiment, a troubleshooting system that receivesing as input one or more symptom(s) of trouble of an IT system and outputting a remedy for the symptom, the troubleshooting system including: a first data base to collecting configuration information of the IT system, a second data base to collecting incidents of trouble including symptoms of trouble and remedies for dealing with the symptoms, a first storage unit to deriveing and storing configuration information of incidents of trouble from the first data base and the second data base using the configuration information as a key, a configuration information similarity degree calculation unit to calculating similarity degrees between input configuration information of the IT system experiencing trouble and configuration information of the incidents of trouble, and an output unit to presenting a remedy for the IT system experiencing the trouble together with the similarity degree.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a view illustrating a specific example of processing according to step S7 in the flowcharts illustrated in FIG. 3 and FIG. 4;

FIG. 6 is a view explaining linkage of troubleshooting knowledge and configuration information by the troubleshooting system of the first embodiment;

FIG. 7 is a view explaining a method of calculation of linkage between symptoms and layers by the troubleshooting system of the second embodiment;

FIG. 8A is a view illustrating a specific example of a physical connection configuration of an IT system, while FIG. 8B is a view illustrating a method of preparing a similarity degree calculation matrix at a layer of a physical connection configuration;

FIG. 9A is a view illustrating a specific example of a network connection configuration of an IT system, while FIG. 9B is a view illustrating a method of preparing a similarity degree calculation matrix at a layer of the network connection configuration;

FIGS. 10A and 10B are views illustrating specific examples of searching for information relating to remedies from symptoms, wherein FIG. 10A is a view illustrating an example of a search for information on candidate remedy knowledge from symptoms, while FIG. 10B is a view illustrating an example of a search for information on the probabilities of occurrence of layers from symptoms and causes;

FIGS. 11A and 11B are views illustrating specific examples of calculation of the similarity degrees of symptoms and the configurations of remedies, wherein FIG. 11A is a view illustrating an example of calculation of a matrix of configurations in an environment where trouble occurs, and FIG. 11B is a view illustrating an example of calculation of similarity degrees with a matrix derived from system IDs of configurations linked with remedy knowledge;

FIGS. 12A and 12B are views illustrating specific examples of calculation of correlation in the case where the numbers of devices of symptoms and remedies differ, wherein FIG. 12A is a view illustrating a case of finding a correlation matched with a smaller number of devices, and FIG. 12B is a view illustrating an example of finding the correlation with a matrix derived from system IDs of configurations linked with remedy knowledge;

FIG. 13 is a view illustrating a specific example of calculation of a score.

DESCRIPTION OF EMBODIMENTS

Figure 1:
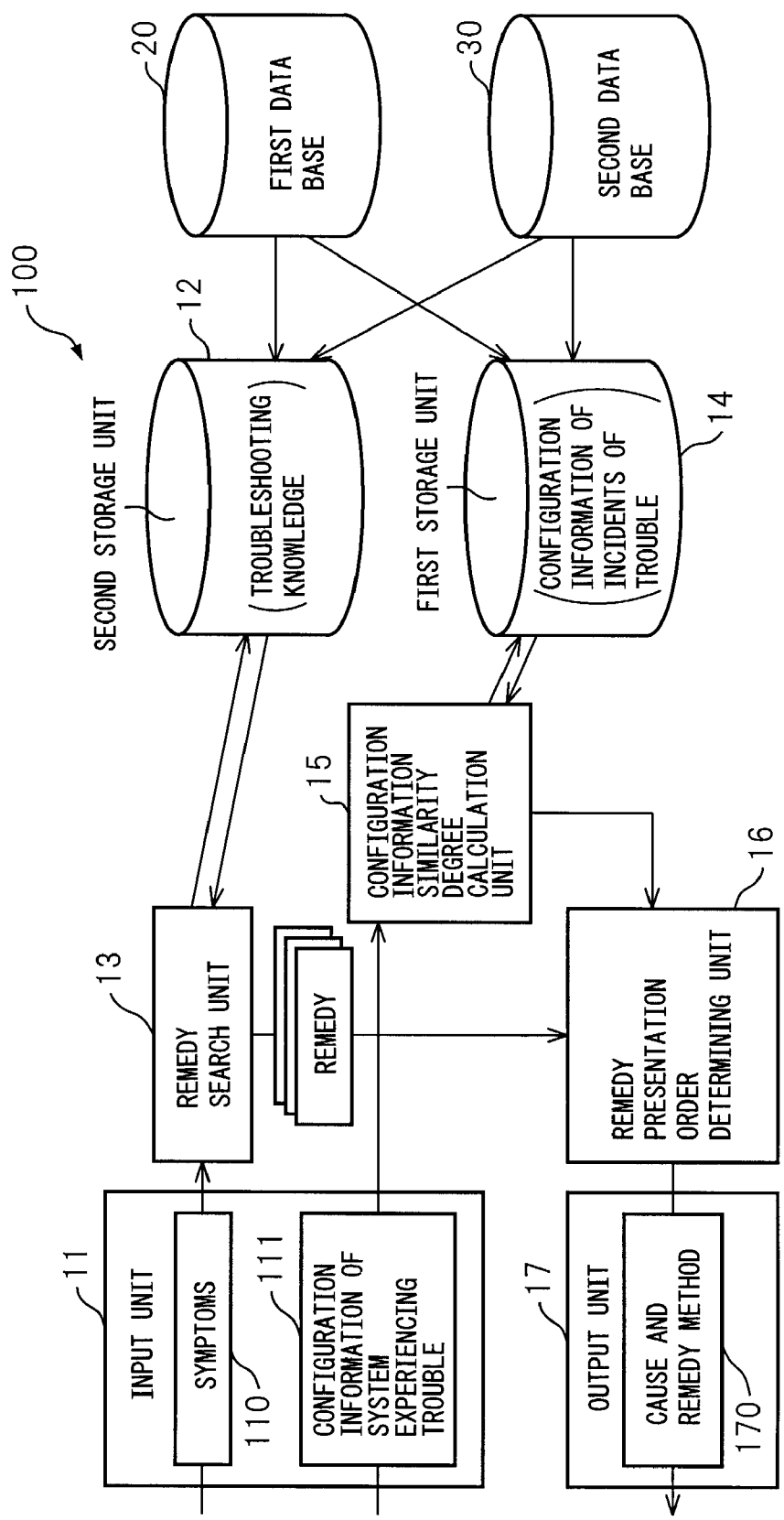
FIG. 1 is a block diagram of the configuration of a troubleshooting system of a first embodiment.

In current troubleshooting systems, the greater the amount of knowledge of past troubleshooting stored, the greater the number of candidate remedies when the SE inputs information on the phenomenon of the trouble, that is, a symptom. This constitutes "search noise" and makes it difficult to find the truly required remedy. Here, this "search noise" means remedies among the candidates which the SE does not want to select, that is, remedies not dealing with the symptoms. In the end, the order of remedies attempted from the large number of candidate remedies is currently determined by the SE based on his knowhow. This makes it difficult to resolve trouble in a short time.

A system, method and computer readable storage medium for troubleshooting of a first embodiment for achieving the above find, at the time of trouble occurring in the IT system, an IT system similar to the configuration of the IT system currently experiencing trouble for a plurality of remedies derived from incidents of trouble occurring in the past using a configuration information similarity degree calculation unit calculating similarity degrees between input configuration information of the IT system experiencing trouble and configuration information of past incidents of trouble and presents candidate remedies for trouble of the IT system in a priority order.

A system, method and computer readable storage medium for troubleshooting of a second embodiment for achieving the above find symptom-layer relation information of the symptoms of trouble and layers causing the trouble from past incidents of trouble, estimate the layer with a high possibility of being the cause of the trouble from the currently occurring symptom, compare the configuration of the IT system experiencing the trouble and the configurations of IT systems in past incidents of trouble in that layer, derive an incident of an IT system similar in configuration, and present candidate remedies for the trouble of the derived IT system in a priority order.

In the troubleshooting system of the first embodiment achieving the above, by finding similarity degrees of configurations, it is possible to narrow down the candidates from a large number of remedies to remedies with a high relevance. For this reason, it is possible to keep down search noise compared with the prior art and present only candidate remedies with high relevance.

Further, according to the troubleshooting system of the first embodiment, compared with the past in which the knowhow of the SE was used to determine the order of attempts for solution, it becomes possible to try out remedies in a priority order based on incidents of trouble which had occurred in an IT system of a similar configuration in the past, so the time required for troubleshooting can be greatly shortened.

In the troubleshooting system of the second embodiment achieving the above, since the similarity degrees of configuration are found for the layer in which the symptom occurs, it is possible to find candidate remedies even if the configurations of other layers differ. Compared with the prior art where only remedies which matched for all configurations were searched for, it is possible to suppress search noise while presenting a large number of candidate remedies.

FIG. 1 is a block diagram illustrating the configuration of a troubleshooting system of a first embodiment. The troubleshooting system 100 for dealing with trouble of an IT system illustrated in FIG. 1 (hereinafter referred to as the "troubleshooting system") may be installed in the IT system, but usually is installed outside of the IT system without interposition of a communication network with the IT system. The troubleshooting system 100 has an input unit 11 for inputting a symptom of trouble and configuration information of the system experiencing the trouble, a first data base 20 storing configuration information of the IT system, and a second data base 30 storing past incidents of trouble including symptoms of trouble and remedies for dealing with the symptoms. The first data base 20 collects and stores configuration information for each layer of the IT system.

Further, the troubleshooting system 100 has a first storage unit 14 deriving and storing configuration information of incidents of trouble from the first data base 20 and second data base 30 using configuration information of the IT system as a key and a second storage unit 12 deriving and storing troubleshooting knowledge of the IT system from the first data base 20 and second data base 30 using a remedy as a key.

The troubleshooting system 100 further has a remedy search unit 13 for searching for troubleshooting knowledge stored in the second storage unit 12 using a symptom 110 of trouble input from the input unit 11 as a key, a configuration information similarity degree calculation unit 15 for calculating similarity degrees between the input configuration information of the IT system experiencing trouble and configuration information of incidents of trouble, and a remedy presentation order determination unit 16 for assigning an order to remedies found by the remedy search unit 13 based on the similarity degrees of configuration information calculated by the configuration information similarity degree calculation unit 15.

Further, the troubleshooting system 100 has an output unit 17 presenting to the SE in charge of system operation the causes and remedy methods 170 derived from incidents of an IT system with a configuration similar to the IT system currently experiencing trouble for the plurality of remedies estimated from incidents of trouble occurring in the past when configuration information 111 of the system experiencing trouble is input from the input unit 11 when trouble occurs in the IT system. The output unit 17 can present remedies for the IT system experiencing trouble together with the similarity degrees.

The troubleshooting system 100 of the first embodiment uses the configuration similarity degree calculation unit 15 to calculate the similarities of configuration information, uses the remedy presentation order determination unit 16 to narrow down and assign an order to the remedy methods, then uses the output unit 17 to present the causes and remedy methods to the SE in charge of operation.

Figure 2:
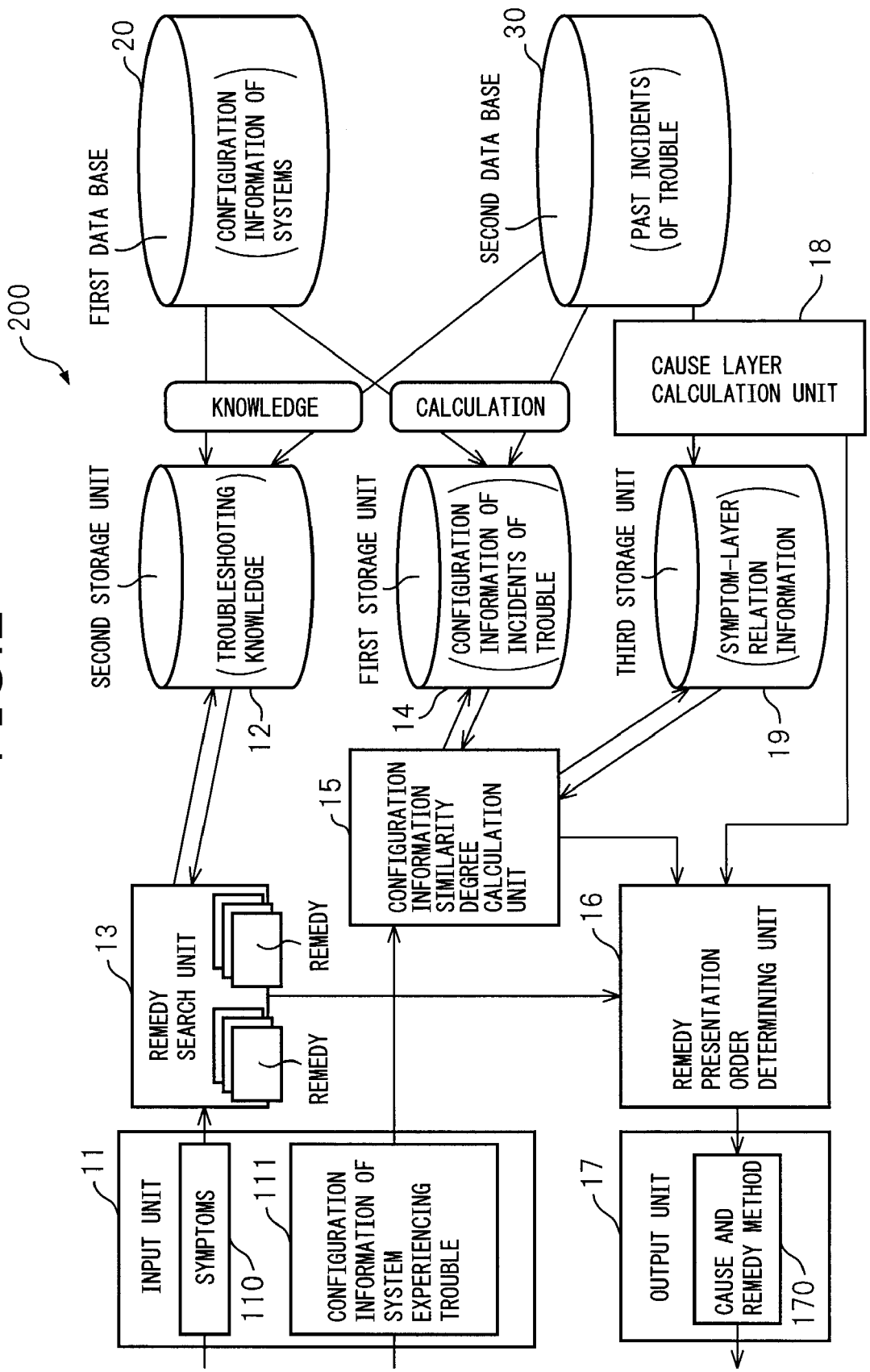
FIG. 2 is a block diagram of the configuration of a troubleshooting system of a second embodiment.

FIG. 2 is a block diagram of the configuration illustrating a troubleshooting system of a second embodiment. As illustrated in FIG. 2, the troubleshooting system 200 of the second embodiment has, in addition to the troubleshooting system 100 of the first embodiment illustrated in FIG. 1, a cause layer calculation unit 18 and a third storage unit 19 storing symptom-layer relation information.

The cause layer calculation unit 18 calculates from the second data base 30 the symptom-layer relation information of symptoms of the trouble and the layers causing the trouble and calculates the probabilities of occurrence of layers having the same symptoms in that symptom-layer relation information.

The third storage unit 19 stores the symptom-layer relation information holding the relationship between symptoms of trouble and layers causing the trouble from past incidents of trouble.

When trouble occurs in an IT system and receiving as input from the input unit 11 configuration information 111 of the system experiencing the trouble, the troubleshooting system 200 of the second embodiment uses the cause layer calculation unit 18 to estimate a layer with a high possibility of being the cause of the trouble from the symptom of the trouble of the IT system currently experiencing the trouble and symptom-layer relation information stored in the third storage unit 19, uses a configuration similarity degree calculation unit 15 to compare the configuration of the IT system experiencing the trouble and the configurations of past incidents of trouble for the estimated layer, uses the remedy presentation order determination unit 16 to narrow down and assign an order to the remedy methods linked with the layer, then uses the output unit 17 to present to the SE in charge of the operation the causes and remedy methods 170 derived from incidents of an IT system with a similar configuration.

In the troubleshooting system 200, the remedy presentation order determination unit 16 assigns an order to the remedies found by the remedy search unit 13 from the similarity degrees calculated by the configuration information similarity degree calculation unit 15 and the probabilities of occurrence calculated by the cause layer calculation unit 18.

The cause layer calculation unit 18 finds a probability of occurrence by dividing the number of times of occurrence of symptoms in the layers having the same symptoms in the symptom-layer relation information by the total number of the same.

The output unit 17 multiplies the similarity degrees with the probabilities of occurrence and reports the found scores.

The similarity degree is found as the correlation between a first matrix expressing input configuration information of the IT system experiencing trouble and a second matrix expressing configuration information linked with remedies in configuration information of incidents of trouble. This correlation is, for example, found using the formula for calculation of the Pearson product-moment correlation coefficient.

Figure 3:
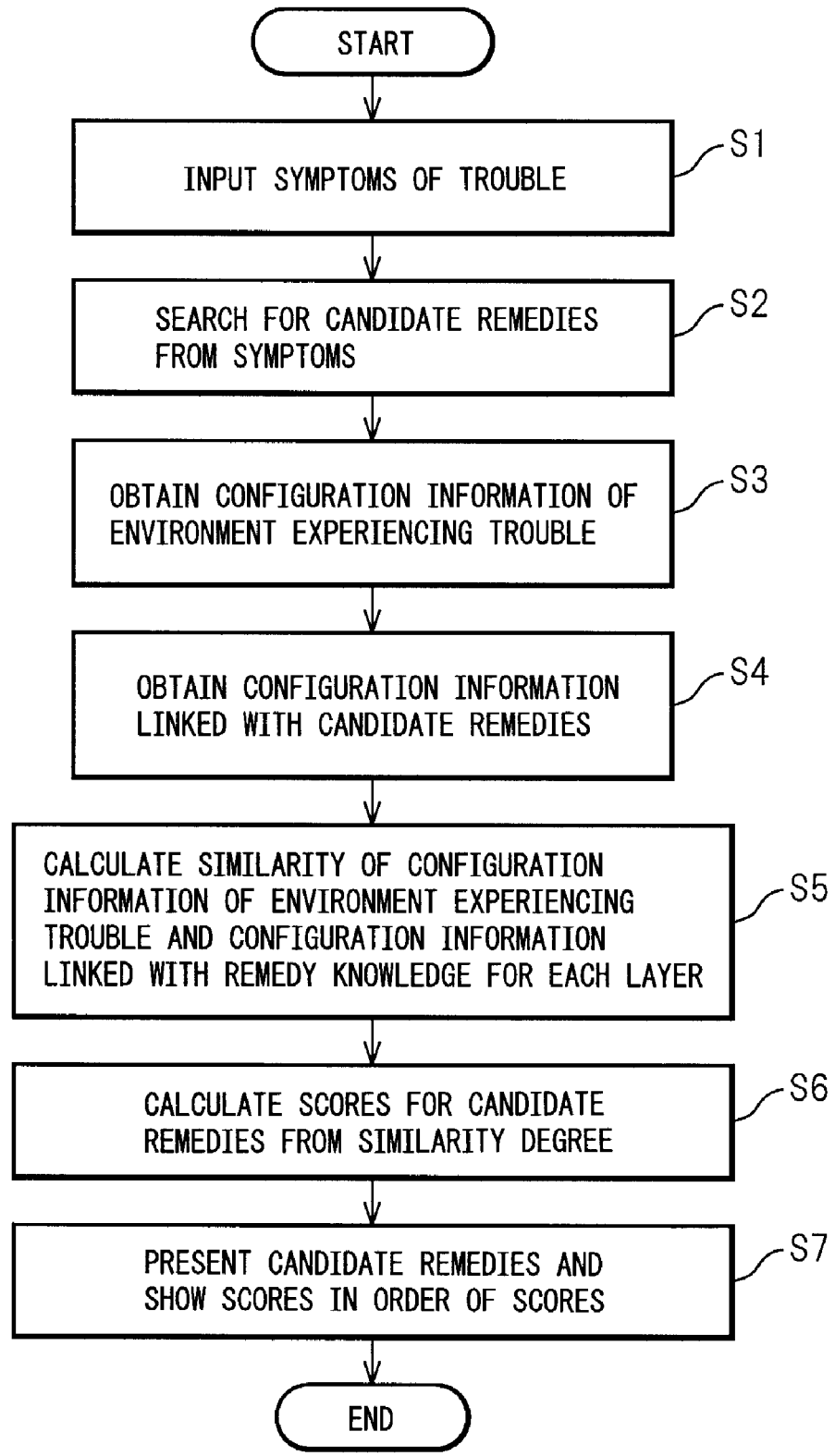
FIG. 3 is a flow chart illustrating processing in a troubleshooting system of the first embodiment.

FIG. 3 is a flowchart illustrating the processing in a troubleshooting system of the first embodiment. The troubleshooting system of the first embodiment executes the following processing: At step S1, it receives input of a symptom 110 of trouble from the input unit 11. At step S2, it searches for several incidents of remedy knowledge becoming candidate remedy methods for the symptom from the symptom (hereinafter referred to as the "candidate remedies").

At steps S3 to S5, it calculates the similarity degrees of the configuration information for each layer. At step S3, it acquires configuration information of the environment of the IT system experiencing trouble. At step S4, it obtains configuration information linked with the candidate remedies from the first storage unit 14. At step S5, it uses the configuration information similarity degree calculation unit 15 to calculate, for each layer, the similarity degrees of the configuration information of the environment experiencing the trouble and the configuration information linked with the remedy knowledge.

At step S6, it calculates the scores of the candidate remedies from the similarity degrees of the configurations and determines the priority order. The method of calculation of the scores will be explained later. At step S7, it uses the remedy presentation order determination unit 16 to present to the SE the candidate remedies in the order of the found scores using the output unit 17.

Figure 4:
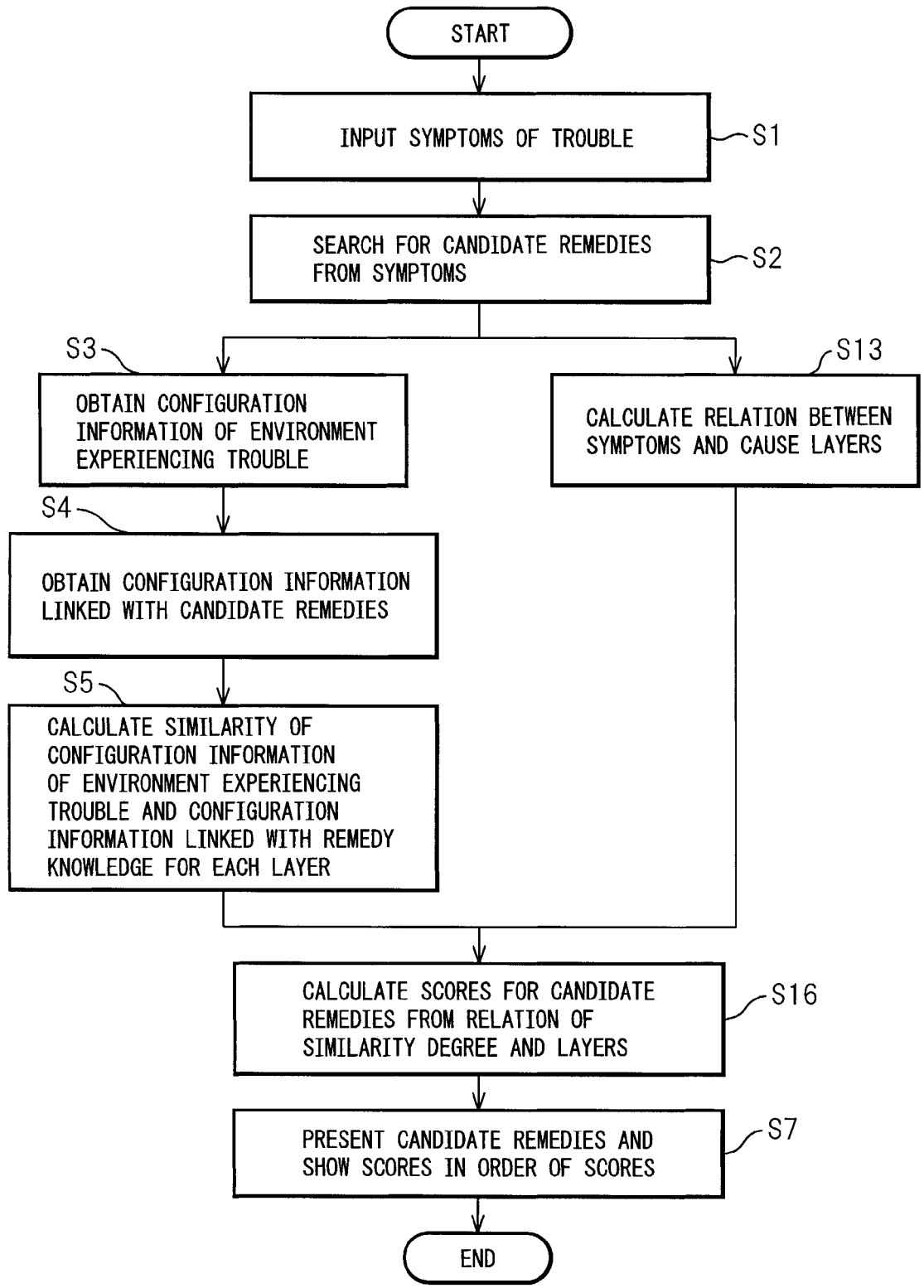
FIG. 4 is a flow chart illustrating processing in a troubleshooting system of the second embodiment.

FIG. 4 is a flowchart illustrating processing in the troubleshooting system of the second embodiment. The troubleshooting system of the second embodiment executes the processing of the following step S13 in addition to steps S3 to S5 in the troubleshooting system of the first embodiment and executes the processing of step S16 instead of the processing of step S6. At step S13, it uses the cause layer calculation unit 18 to calculate the relation between symptoms and the cause layers. At step S16, it calculates the scores of the candidate remedies from the relation of the similarity degrees of configuration and layers and determines a priority order.

FIG. 5 is a view illustrating a specific example of the processing by step S7 in the flowcharts of FIG. 3 and FIG. 4. The left side column "troubleshooting knowledge ID" indicates the identification data for troubleshooting knowledge for symptoms, the center column "score" indicates the success rates of the remedies for the symptoms by using the troubleshooting knowledge, and the right side column "remedy" indicates the contents of the troubleshooting knowledge, that is, the remedy methods for the symptoms. From FIG. 6, it will be understood that these are illustrated in the order of the higher success rates of the remedies.

FIG. 6 is a view explaining the linkage of the troubleshooting knowledge and configuration information by the troubleshooting system of the first embodiment. The top table indicates the data base of past incidents of trouble stored in the second data base 30 illustrated in FIG. 1 and FIG. 2. The bottom table indicates the data base of the configuration information of incidents of trouble stored in the first storage unit 14 illustrated in FIG. 1 and FIG. 2.

In the top table, in the order from the left column to the right column, the first column indicates the incident ID, the second column indicates the system ID for identifying the configuration information of the IT system, the third column indicates the symptoms illustrating the nature of the trouble, the fourth column indicates details of the symptoms, the fifth column indicates the causes of trouble, the sixth column indicates the remedy method for the trouble, and the seventh column indicates the layer experiencing trouble. The top table omits the incidents from the sixth row on and indicates only the incidents in the first to fifth rows.

In the bottom table, in the order from the left column to the right column, the first column indicates the troubleshooting knowledge IDs, the second column indicates the symptoms of the trouble, the third column indicates the system IDs for identifying the configuration information of the IT system, and the fourth column indicates the remedy methods for the symptoms. The bottom table indicates remedy knowledge corresponding to incidents of the first to fifth rows of the top table in the first to fifth rows. In the past, in the bottom table, the third column did not indicate the system ID for identifying the configuration information of the IT system.

As illustrated in FIG. 1 and FIG. 2, the data base of troubleshooting knowledge stored in the second storage unit 12 is derived from the data base of configuration information of the system stored in the first data base 20 and the data base of past incidents of trouble stored in the second data base 30.

FIG. 7 is a view for explaining the method of calculation of linkage between symptoms and layers by the troubleshooting system of the second embodiment. The top table indicates the data base of past incidents of trouble stored in the second data base 30 illustrated in FIG. 1 and FIG. 2. The bottom table indicates the data base of the symptom-layer relation information stored in the third storage unit 18 illustrated in FIG. 1 and FIG. 2. The top table is the same as the top table of FIG. 6, so explanations will be omitted.

In the bottom table, in the order from the left column to the right column, the first column indicates the symptoms of trouble, the second column indicates the probabilities of occurrence, and the third column indicates the layers. The bottom table indicates the information of the probabilities of occurrence and layers illustrating how much the symptoms and layers in the examples of the first to fourth lines of the top table are related in the first to fourth lines.

As will be understood from the bottom table, there is a single remedy method for the symptom illustrated in the first row of "server unable to start up". There is only one remedy for the layer of hardware configuration, so the probability of occurrence becomes 1.00. There are a total of four remedy methods for the symptom illustrated in the second to fourth rows of "software connection broken". There are two for the layer of hardware configuration, one for the layer of network connection configuration, and one for the layer of software configuration, so the probability of occurrence in the second row becomes 0.25, the third row 0.50, and the fourth row 0.25.

Figures 8A, 8B:
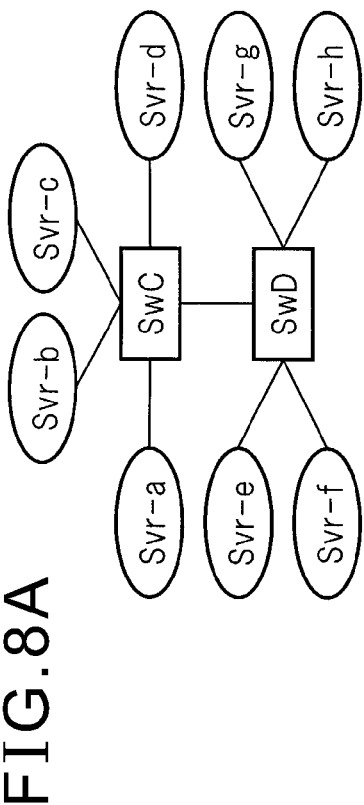

FIG. 8A is a view illustrating a specific example of the physical connection configuration of an IT system, while FIG. 8B is a view illustrating a method of preparing a similarity degree calculation matrix at the layer of the physical connection configuration. An IT system is comprised of software including an operating system, middleware, and application programs, a communication network provided above that, and hardware including servers or routers or other switches connected above that, that is, three layers, in a hierarchical structure. The layers can be said to be various types of the configurations of IT systems.

As layers of the IT system, there are also layers of physical connection configuration and system device configuration etc. The physical connection configuration is information illustrating the relative connections between devices forming the hardware, while the system device configuration is information illustrating the types and numbers of the devices forming the IT system.

In the specific example of the physical connection configuration of the IT system illustrated in FIG. 8A, the hardware configuration of the IT system is comprised of eight servers (Svr-a, Svr-b, Svr-c, Svr-d, Svr-e, Svr-f, Svr-g, and Svr-h) and two switches (SwC, SwD). The servers and switch devices are connected as illustrated. The switches include routers, hubs, and other devices.

FIG. 8B illustrates an example of preparation of a matrix of the physical connection configuration of a system ID of the IT system of T-db-020 when 007-0620-1802-020 is generated as the incident ID illustrated at the top of FIG. 7 in the layer of the physical connection configuration. The matrix illustrated in FIG. 8B illustrates specifically the configuration information of the IT system.

The method of preparation of a matrix for calculating the similarity degree at the layer of the physical connection configuration is realized by the following first to third steps.

First step: The method refers to the physical connection configuration of the IT systems experiencing incidents of trouble in the past from the physical connection configuration information and prepares the physical connection configuration of the devices (nodes) at any layer by the links connecting the computers, routers, hubs, and other devices, that is, one node and another node. In the end, FIG. 8A is prepared.

Second step: The method sorts the nodes in the order of most connections.

Third step: A matrix is output by the layer of physical connection configuration comprised of the above eight servers and two switches at the topmost level of the rows and the leftmost end of the columns illustrated in FIG. 8B. When the nodes are connected, "1" is set, while when they are not connected, "0" is set.

Figures 9A, 9B:
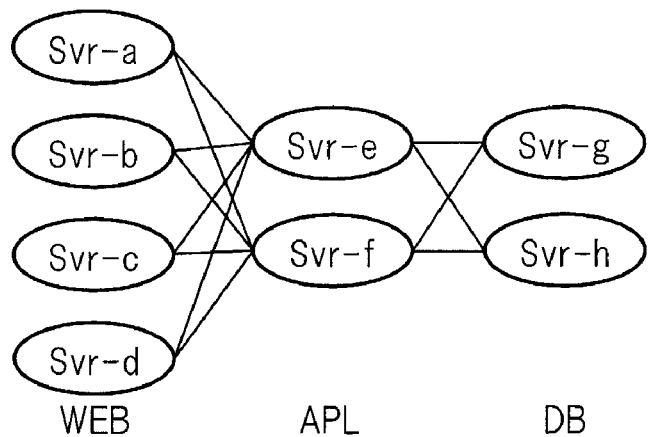

FIG. 9A is a view illustrating a specific example of the network connection configuration of the IT system, while FIG. 9B is a view illustrating a method for preparing a similarity degree calculation matrix at the layer of the network connection configuration.

In the specific example of the network connection configuration of the IT system illustrated in FIG. 9A, the network connection configuration of the IT system is comprised of eight servers (Svr-a, Svr-b, Svr-c, Svr-d, Svr-e, Svr-f, Svr-g, Svr-h). The servers are connected as illustrated. The servers Svr-a, Svr-b, Svr-c, and Svr-d are web servers (WEB), the servers Svr-e and Svr-f are servers providing predetermined applications (APL), and the servers Svr-g and Svr-h are servers storing data bases (DB).

FIG. 9B illustrates an example of preparation of a matrix of the network connection configuration of a system ID of the IT system of T-db-020 when 007-0620-1802-020 is generated as the incident ID illustrated at the top of FIG. 7 in the layer of the physical connection configuration. The matrix illustrated in FIG. 9B illustrates specifically the configuration information of the IT system.

The method of preparation of a matrix for calculating the similarity degree at the layer of the network connection configuration is realized by the following first to third steps.

First step: The method refers to the network connection configuration of the IT systems experiencing incidents of trouble in the past from the network connection configuration information and prepares the network connection configuration of the devices (nodes) at any layer by the links connecting the servers. In the end, FIG. 9A is prepared.

Second step: Sort nodes in order of greater number of connections.

Third step: A matrix is output by the layer of network connection configuration comprised of the above eight servers at the topmost level of the rows and the leftmost end of the columns illustrated in FIG. 9B. When the nodes are connected, "1" is set, while when they are not connected, "0" is set.

Figure 10A:
Figure 10B:

FIGS. 10A and 10B are views illustrating specific examples of searching for information regarding remedies from symptoms, wherein FIG. 10A is a view illustrating an example of searching for information of candidate remedy knowledge from the symptoms, and FIG. 10B is a view illustrating an example of searching for information of the probabilities of occurrence of layers from the symptoms and causes.

As illustrated in FIG. 10A, when the symptom "server unable to start up" is input, remedy knowledge giving a single candidate of the troubleshooting knowledge ID of the Symptom 001 is searched through from the second data base 30, while when the symptom "software connection broken" is input, remedy knowledge giving four candidates of the troubleshooting knowledge ID of the Symptom 002 to Symptom 005 is searched through from the second data base 30. Further, the table illustrated in FIG. 10A is stored in the first storage unit 14.

As illustrated in FIG. 10B, when the symptom "server unable to start up" is input, the single cause layer "hardware configuration" is found from the second data base 30, while when the symptom "software connection broken" is input, the single cause layer "hardware configuration", two "network configuration", and single "software configuration" are found from the second data base 30. Further, the table illustrated in FIG. 10B is stored in the third storage unit 18.

Since there is a single cause layer for the symptom "server unable to start up", the occurrence probability becomes 1.00, while since there are four cause layers for the symptom "software connection", the occurrence probability of the layer "hardware configuration" is 0.25, the occurrence probability of the layer "network configuration" is 0.5, and the occurrence probability of the layer "software configuration" is 0.25.

FIGS. 11A and 4B are views illustrating specific examples of calculation of the similarity degree of symptoms and configuration of remedies. FIG. 11A is a view illustrating an example of calculation of a matrix of a configuration in an environment where trouble occurs, while FIG. 11B is a view of an example of calculation of a similarity degree with a matrix derived from system IDs of configurations linked with the remedy knowledge.

The matrix illustrated in FIG. 11A is the same as the matrix illustrated in FIG. 9B except for the point that at Svr-a=0, Svr-f=0 and that at Svr-f=0, Svr-a=0, that is, the point that Svr-a and Svr-f are not connected, while the matrix illustrated in FIG. 11B is the same as the matrix illustrated in FIG. 9B. That is, the relative connections of the servers Svr-a to Svr-h are the same. Further, FIG. 11B illustrates a matrix in the case where the system ID is T-db-020 and the layer is a network connection configuration.

The matrix illustrated in FIG. 11A is designated as the set X, while the matrix illustrated in FIG. 11B is designated as the set Y.

The method of calculation of the correlation coefficient $\rho_{X,Y}$ of the sets X and Y is based on the formula for calculation of the Pearson product-moment correlation coefficient and is as follows:

The correlation coefficient $\rho_{X,Y}$ is $$\rho_{X,Y} = \text{cov}(X,Y)/\sigma_X \sigma_Y$$

where, covariance (X,Y) of the set X and Y is $$\text{cov}(X,Y) = (1/n)\Sigma(X_i - \mu_x)(Y_i - \mu_y).$$

where, X and Y are variables.

The squares $\sigma_x^2$, $\sigma_y^2$ of the standard errors $\sigma_x$, $\sigma_y$ of the variables X and Y are expressed by $$\sigma_x^2 = (1/n)\Sigma(X_i - \mu_x)^2$$

and $$\sigma_y^2 = (1/n)\Sigma(Y_i - \mu_y)^2.$$

where, $\mu_x$ and $\mu_y$ are respectively the average values of the parent sets X, Y.

The correlation coefficient $\rho_{X,Y}$ found using the above calculation method from the set X of the matrix illustrated in FIG. 11A and the set Y of the matrix illustrated in FIG. 11B is 0.92884. This indicates the similarity degree of the set X and set Y.

FIG. 12 is a view illustrating a specific example of calculating the correlation when the numbers of devices of the symptoms and remedies differ, wherein FIG. 12A is a view illustrating an example of finding the correlation match with a smaller number of devices, while FIG. 12B is a view illustrating an example of finding the correlation with a matrix derived from system IDs of configurations linked with remedy knowledge. Further, FIG. 12B illustrates a matrix in the case of a system ID of T-db-027 and a layer of the network connection configuration.

FIG. 12A illustrates an 8×8 matrix prepared matched with the smaller number of devices, that is, eight, in the case where the number of devices of the symptoms and remedies differ, for example, in the case of 10 devices and eight devices, while FIG. 12B illustrates an example of converting the 8×8 matrix illustrated in FIG. 13A to a 7×7 matrix. The correlation coefficient $\rho_{X,Y}$, that is similarity degree, found using the above calculation method from the matrix illustrated in FIG. 12A and the matrix illustrated in FIG. 12B is 0.90830.

FIG. 13 is a view illustrating a specific example of calculation of the scores. In the table illustrated in FIG. 13, the columns from the left indicate the data of the troubleshooting knowledge ID, symptoms, system IDs, remedies, layers, similarity degrees (correlation coefficients), probabilities of occurrence, scores, and order of presentation.

FIG. 13 illustrates a table presenting, for each layer, the probability of occurrence of the layer found and the similarity degree and score calculated as the product of the similarity degree and probability of occurrence for each of the four troubleshooting knowledge IDs of Symptom 002 to Symptom 005 from the symptom "software connection broken" illustrated in FIG. 10B and cause layers "software configuration", "network connection configuration", "physical connection configuration", "hardware configuration" and "system device configuration". Further, the order of presentation is the order of presentation from the highest score.

From the table of FIG. 13, the scores are found for the troubleshooting knowledge IDs Symptom 002 to Symptom 005. The remedy method when selecting the highest score Symptom 002 is displayed in the window at the bottom right of the screen 500. In the past, the "score" was not displayed, so it was not learned which remedy method should be started with to solve trouble, but according to the present embodiment, the troubleshooting candidates are displayed in the order of the highest "score" down, so the time for solving trouble can be shortened.

Figure 14:
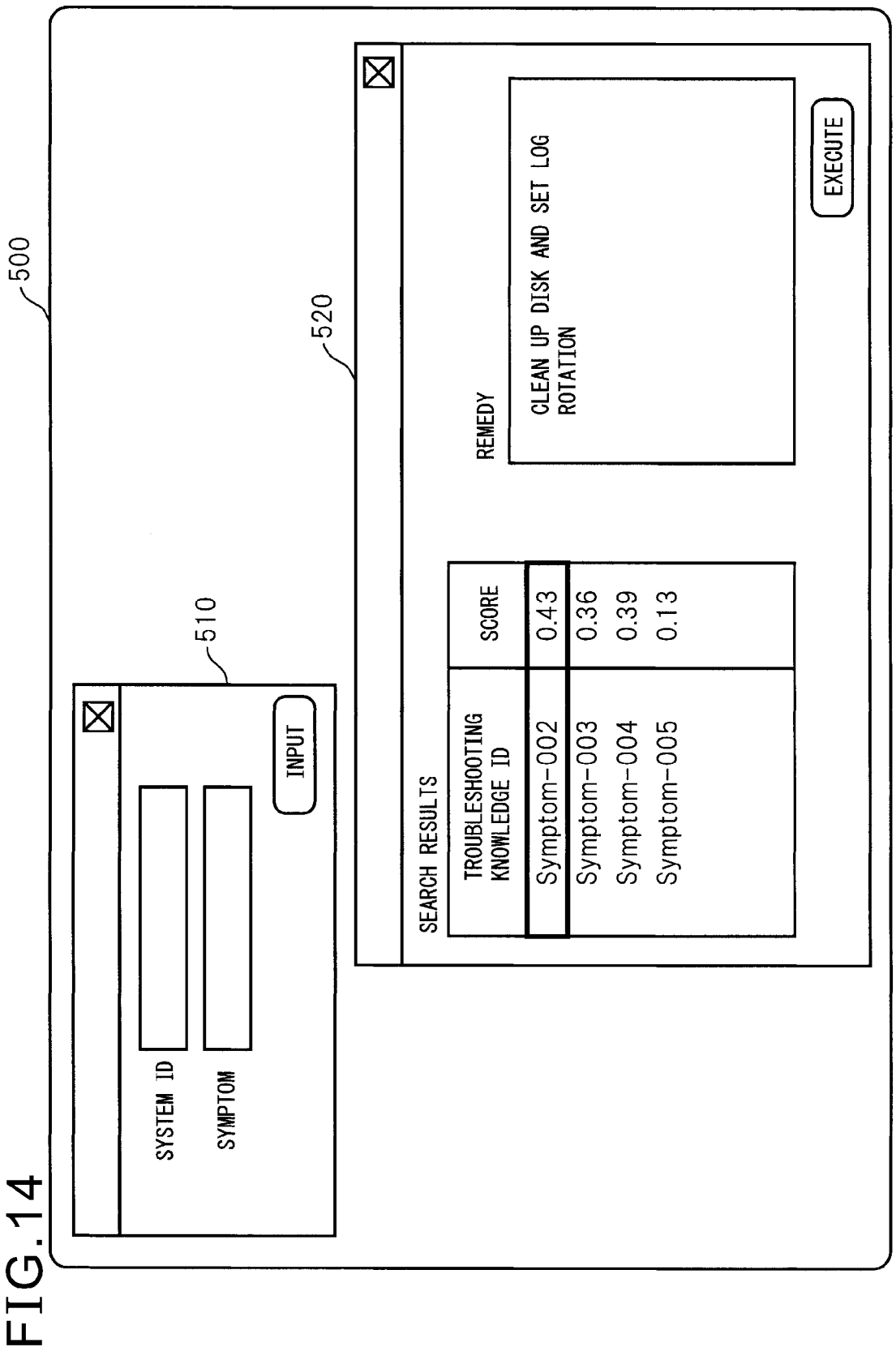
FIG. 14 is a view illustrating an embodiment of presentation.

FIG. 14 is a view illustrating an example of a presentation. The window 510 at the top left of the screen illustrated in FIG. 14 illustrates the region for input of the system and symptoms. The window 520 at the bottom right of the screen 500 indicates the search results.

In the explanation of the above embodiment, the word "presented" was used. This means the SE of operation of the IT system using his or her own computer to "show for the purpose of confirmation". Specifically, it means "display on a display device" or "print by a printer".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A troubleshooting system that receives as input one or more symptoms of trouble of an IT system and outputting a remedy for the one or more symptoms, the troubleshooting system comprising:
   a first data base to collect configuration information of the IT system,
   a second data base to collect incidents of trouble including symptoms of trouble and remedies for dealing with the symptoms,
   a first storage unit to derive and store configuration information of incidents of trouble from the first data base and the second data base using the configuration information of the IT system as a key,
   a configuration information similarity degree calculation unit to calculate similarity degrees between input configuration information of the IT system experiencing trouble and configuration information of the incidents of trouble,
   a second storage unit to derive and store troubleshooting knowledge of the IT system from the first data base and the second data base using the remedy as a key,
   a remedy search unit to search through troubleshooting knowledge stored in the second storage unit using a symptom of trouble input from an input unit as a key,
   a remedy presentation order determination unit to assign an order to remedies found by the remedy search unit based on the similarity degrees of configuration information calculated by the configuration information similarity degree calculation unit, and
   an output unit to present a remedy for the IT system experiencing the trouble together with one of the similarity degrees.

2. The troubleshooting system according to claim 1, wherein the first data base collects configuration information for each layer of the IT system.

3. The troubleshooting system according to claim 1, wherein the system is further provided with:
   a cause layer calculation unit to calculate symptom-layer relation information between symptoms of trouble and the layers causing the trouble from the second data base and calculating probabilities of occurrences of layers having the same symptoms in the symptom-layer relation information and
   a third storage unit to store the symptom-layer relation information,
   the remedy presentation order determination unit to assign an order to remedies found by the remedy search unit from the similarity degrees calculated by the configuration information similarity degree calculation unit and the probabilities of occurrence calculated by the cause layer calculation unit.

4. The troubleshooting system according to claim 3, wherein the cause layer calculation unit finds the probability of occurrence by dividing the number of times of occurrence of the symptoms at the layers having the same symptoms in the symptom-layer relation information by the total number of times of occurrence of the symptoms.

5. The troubleshooting system according to claim 3, wherein the output unit multiplies the similarity degrees and the probabilities of occurrence and presents the found scores.

6. The troubleshooting system according to claim 1, wherein
   the similarity degree is found as a correlation between a first matrix expressing input configuration information of the IT system experiencing trouble and a second matrix expressing configuration information linked with remedies in configuration information of the incidents of trouble.

7. The troubleshooting system according to claim 6, wherein the correlation is found using a formula for calculation of the Pearson product-moment correlation coefficient.

8. A troubleshooting method receiving as input one or more symptoms of trouble of an IT system and outputting a remedy for the one or more symptoms, the troubleshooting method comprising:
   preparing a first data base collecting configuration information of the IT system;
   preparing a second data base collecting incidents of trouble including symptoms of trouble and remedies for dealing with the symptoms;
   deriving configuration information of incidents of trouble from the first data base and the second data base using the configuration information of the IT system as a key and storing it in a first storage unit;
   calculating configuration information similarity degrees between input configuration information of the IT system experiencing trouble and configuration information of the incidents of trouble;
   deriving troubleshooting knowledge of the IT system from the first data base and the second data base using the remedy as a key and storing it in the second storage unit;
   searching through troubleshooting knowledge stored in the second storage unit using a symptom of trouble input from an input unit as a key;
   assigning an order to remedies found by the searching based on the similarity degrees of configuration information calculated by the calculating; and
   presenting a remedy for the IT system experiencing the trouble together with one of the similarity degrees.

9. The troubleshooting method according to claim 8, further comprising:
   calculating symptom-layer relation information between symptoms of trouble and the layers causing the trouble from the second data base and calculating probabilities of occurrences of layers having the same symptoms in the symptom-layer relation information; and
   storing the symptom-layer relation information in a third storage unit;
   wherein the assigning an order to remedies found by the searching from the similarity degrees calculated by the calculating configuration information similarity degrees and the probabilities of occurrence calculated by the calculating symptom-layer relation information.

10. A computer readable, non-transitory medium storing a troubleshooting program making a computer execute a troubleshooting method of receiving as input one or more symptoms of trouble of an IT system and outputting a remedy for the one or more symptoms, the troubleshooting program making the computer execute:

preparing a first data base collecting configuration information of the IT system;

preparing a second data base collecting incidents of trouble including symptoms of trouble and remedies for dealing with the symptoms;

deriving configuration information of incidents of trouble from the first data base and the second data base using the configuration information of the IT system as a key and storing it in a first storage unit;

calculating configuration information similarity degrees between input configuration information of the IT system experiencing trouble and configuration information of the incidents of trouble;

deriving troubleshooting knowledge of the IT system from the first data base and the second data base using the remedy as a key and storing it in the second storage unit;

searching through troubleshooting knowledge stored in the second storage unit using a symptom of trouble input from an input unit as a key;

assigning an order to remedies found by the searching based on the similarity degrees of configuration information calculated by the calculating; and presenting a remedy for the IT system experiencing the trouble together with one of the similarity degrees.

11. The computer readable, non-transitory medium storing a troubleshooting program according to claim 10, the troubleshooting program further making the computer execute:

calculating symptom-layer relation information between symptoms of trouble and the layers causing the trouble from the second data base and calculating probabilities of occurrences of layers having the same symptoms in the symptom-layer relation information; and storing the symptom-layer relation information in a third storage unit;

wherein the assigning an order to remedies found by the searching from the similarity degrees calculated by the calculating configuration information similarity degrees and the probabilities of occurrence calculated by the calculating symptom-layer relation information.

* * * * *